United States Patent [19]

Senior et al.

[11] 4,043,362

[45] Aug. 23, 1977

[54] CUTTING AND INSULATION STRIPPING APPARATUS FOR TWISTED WIRE PAIR

[75] Inventors: Robert B. Senior, Grand Haven; Frederick Karasinski, Grand Rapids, both of Mich.

[73] Assignee: Gardner-Denver Company, Dallas, Tex.

[21] Appl. No.: 656,239

[22] Filed: Feb. 9, 1976

[51] Int. Cl.² ............................................. B21F 7/00
[52] U.S. Cl. ...................................... 140/1; 140/149; 81/9.51
[58] Field of Search ...................... 81/9.51; 140/1, 149

[56] References Cited

U.S. PATENT DOCUMENTS 3,815,449  6/1974  Folkenroth et al. .................. 81/9.51
3,853,156  12/1974  Folkenroth et al. ............. 81/9.51 X Primary Examiner—Richard B. Lazarus Attorney, Agent, or Firm—Michael E. Martin

[57] ABSTRACT

Apparatus for cutting and insulation stripping of twisted conductor wire pairs comprises a wire feed mechanism for feeding predetermined lengths of twisted wire pairs into clamping mechanism including a rotatable clamp operable to untwist a predetermined portion of a wire pair. Movable cams operate to position two wires of the pair whereby dual sets of insulation cutting blades, cooperable with the cams, move in to cut preselected lengths of insulation from the trailing end of a wire pair and the leading end of the next wire pair to be formed. Wire cutting blades operate in unison with the insulation cutting blades to cut the wire pair between the respective sets of insulation cuts. Carriage mechanism is operable to move the wire clamps apart to strip the cut insulation from the respective trailing and leading ends of the wire pairs.

20 Claims, 23 Drawing Figures

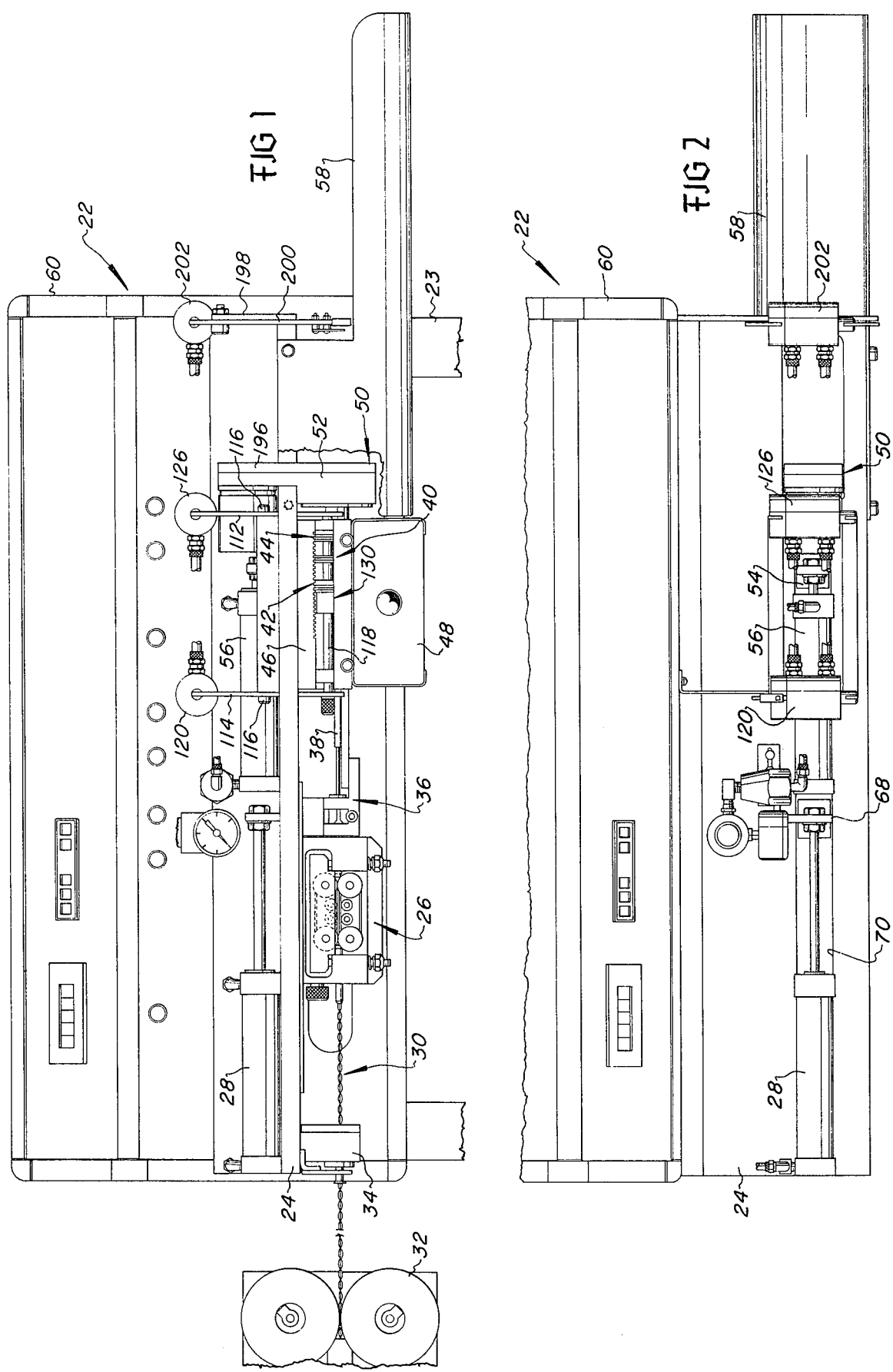

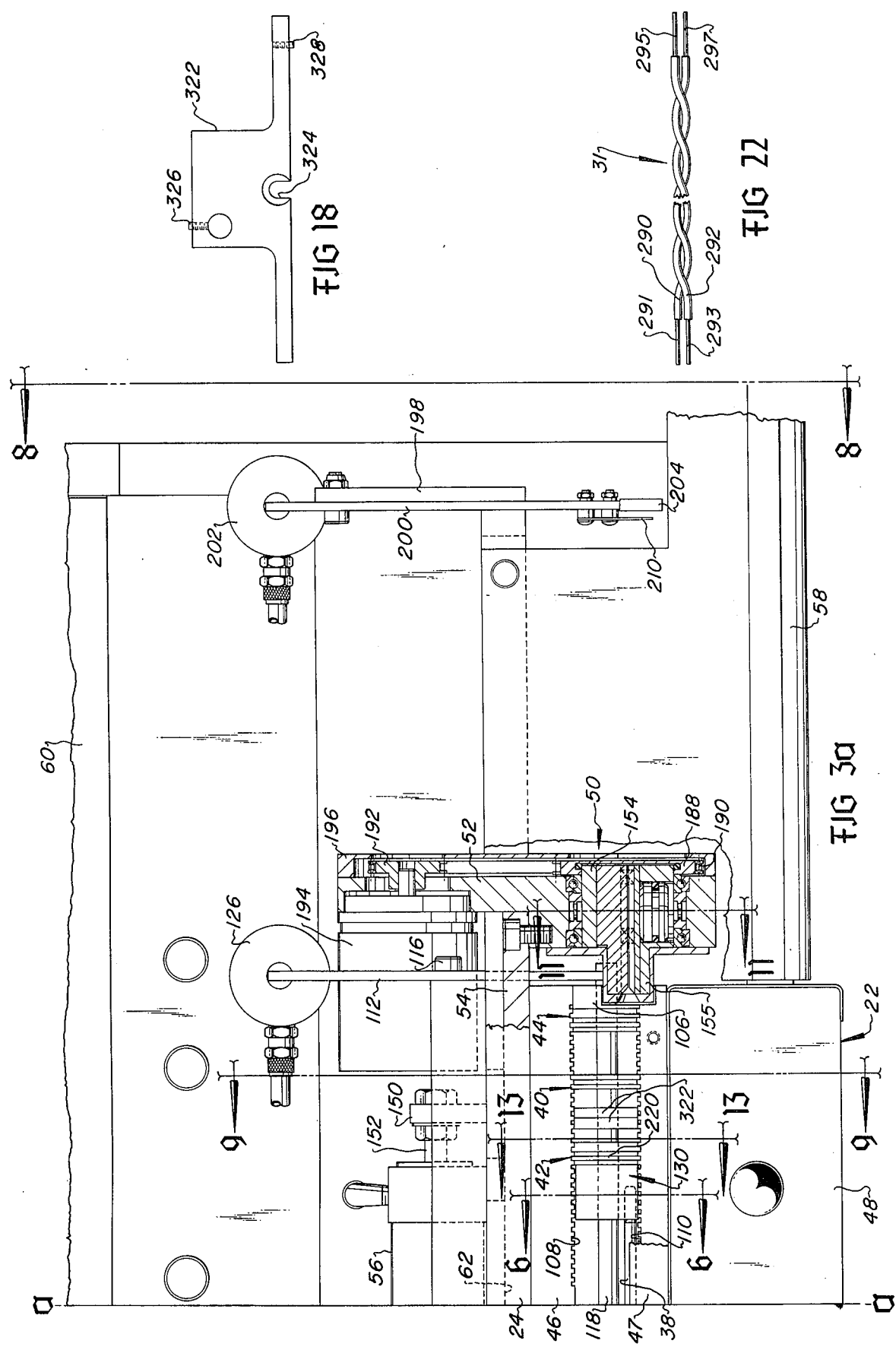

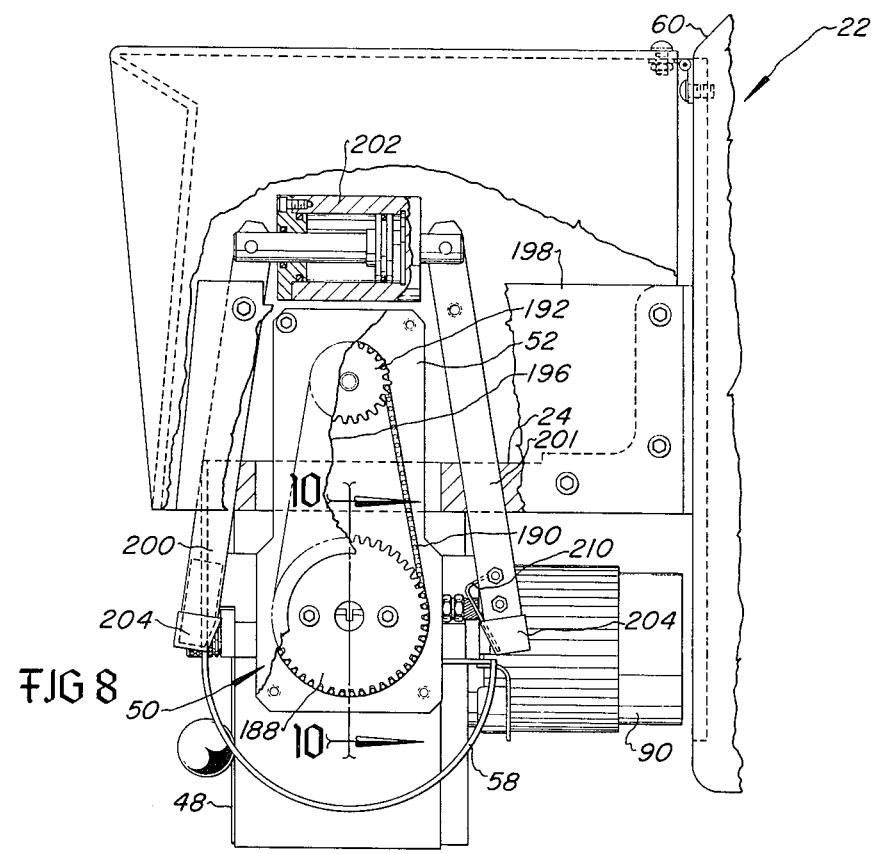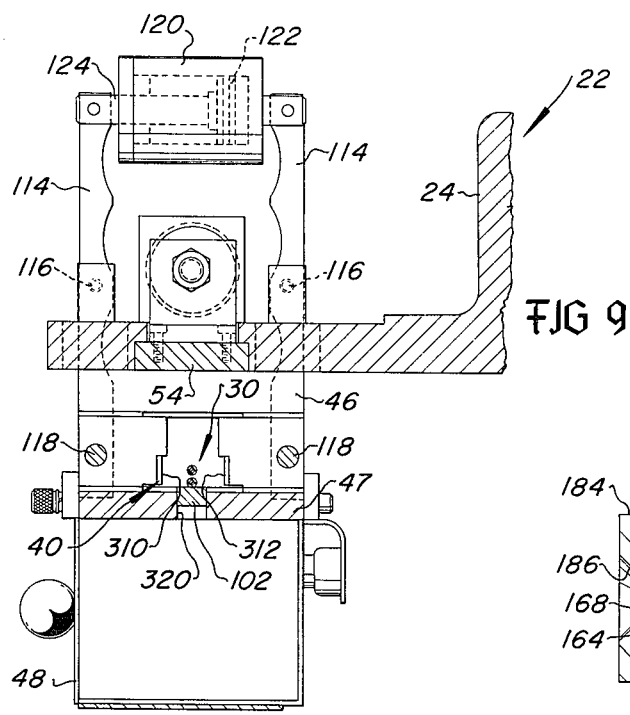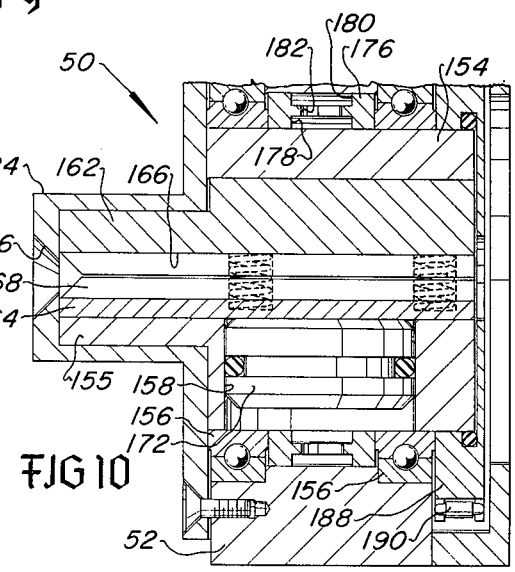

CUTTING AND INSULATION STRIPPING APPARATUS FOR TWISTED WIRE PAIR

BACKGROUND OF THE INVENTION

Twisted wire pairs are widely used in electrical equipment for numerous reasons including the elimination of electrical interference, and providing more compact and easily identifiable wiring arrangement in complicated circuits and wire harnesses. Because of the extensive use of twisted wire pairs it has become desirable to have highly productive means for preparing large numbers of wire pairs which are cut to predetermined lengths and which have the insulation stripped from one or both ends of each wire of the pair. It is particularly desirable to have means which can automatically prepare wire pairs cut to predetermined lengths with insulation stripped from one or both ends and which can operate in conjunction with automatic or semi-automatic circuit wiring machines.

Known methods for preparing twisted wire pairs with insulation stripped from the wire ends include entirely manual operations using hand-held tools. Furthermore, U.S. Pat. Nos. 3,779,290 and 3,815,449 disclose apparatus for stripping insulation from one end of a wire pair and wherein the wire pair is manually inserted in the apparatus. U.S. Pat. No. 3,827,465 discloses apparatus which prepares individual wires of predetermined length and twists the wires together after the insulation is stripped.

The present invention is directed to apparatus which will automatically and continuously prepare predetermined lengths of twisted wire pairs which have insulation stripped from opposite ends of one or both wires of the wire pair. Such apparatus according to the present invention is operable to prepare preselected lengths of twisted wire pairs from a substantially continuous and uncut supply such as a large spool of pretwisted wire.

The apparatus of the present invention also provides improved means for clamping the twisted wire pair and untwisting the wires of the pair in the section of wire that is to form the end portions of the wire leads whereby the insulation may then be cut and stripped automatically. The untwisting mechanism included in the present invention is operable to impart a controlled amount of untwist to a portion of the twisted wire pair whereby the wires of the pair may be cut and have a predetermined length of insulation stripped from the wire ends formed by the cut.

The apparatus of the present invention further provides improved mechanism for positioning an untwisted portion of a twisted wire pair whereby the insulation on the untwisted portion may be accurately cut without unwanted cutting or scratching of the conductor wire and without ripping or tearing the insulation at the insulation cut. The improved wire positioning mechanism of the present invention includes plural cams cooperable with mechanism for actuating insulation cutting blades whereby the untwisted portion 1 of the wire pair is properly positioned for accurately cutting the insulation without damaging the conductor wire.

The apparatus of the present invention provides improved means for producing twisted wire pair of predetermined length with insulation stripped from the wire ends and which is adapted to be operated in conjunction with automatically controlled wire connecting machinery or for other applications where large quantities of twisted wire pairs are needed.

BRIEF DESCRIPTION OF THE DRAWINGS

FIG. 1 is a longitudinal side elevation of the cutting and insulation stripping apparatus of the present invention;

FIG. 2 is a plan view of the apparatus of the present invention;

FIG. 3a is a continuation of FIG. 3 from the line a—a of FIG. 3;

FIG. 6 is a section view taken along line 6—6 of FIG. 3a;

FIG. 8 is a view taken substantially from the line 8—8 of FIG. 3a.

FIG. 9 is a section view taken from the line 9—9 of FIG. 3a;

FIG. 10 is a section view taken from the line 10—10 of FIG. 8;

FIG. 11 is a section view taken along the line 11—11 of FIG. 3a;

FIGS. 12 through 17 are detail views of the insulation cutting blades and wire positioning cam mechanism in various positions wherein FIGS. 13, 15 and 17 are taken from the line 13—13 of FIGS. 3a and FIGS. 12, 14, and 16 are section views taken from the respective numbered lines shown on FIGS. 13, 15 and 17;

FIG. 18 is a front elevation of one of the wire guides;

FIG. 22 is a plan view of a length of twisted wire pair prepared by the apparatus of the present invention.

DESCRIPTION OF THE PREFERRED EMBODIMENT

Figure 3:
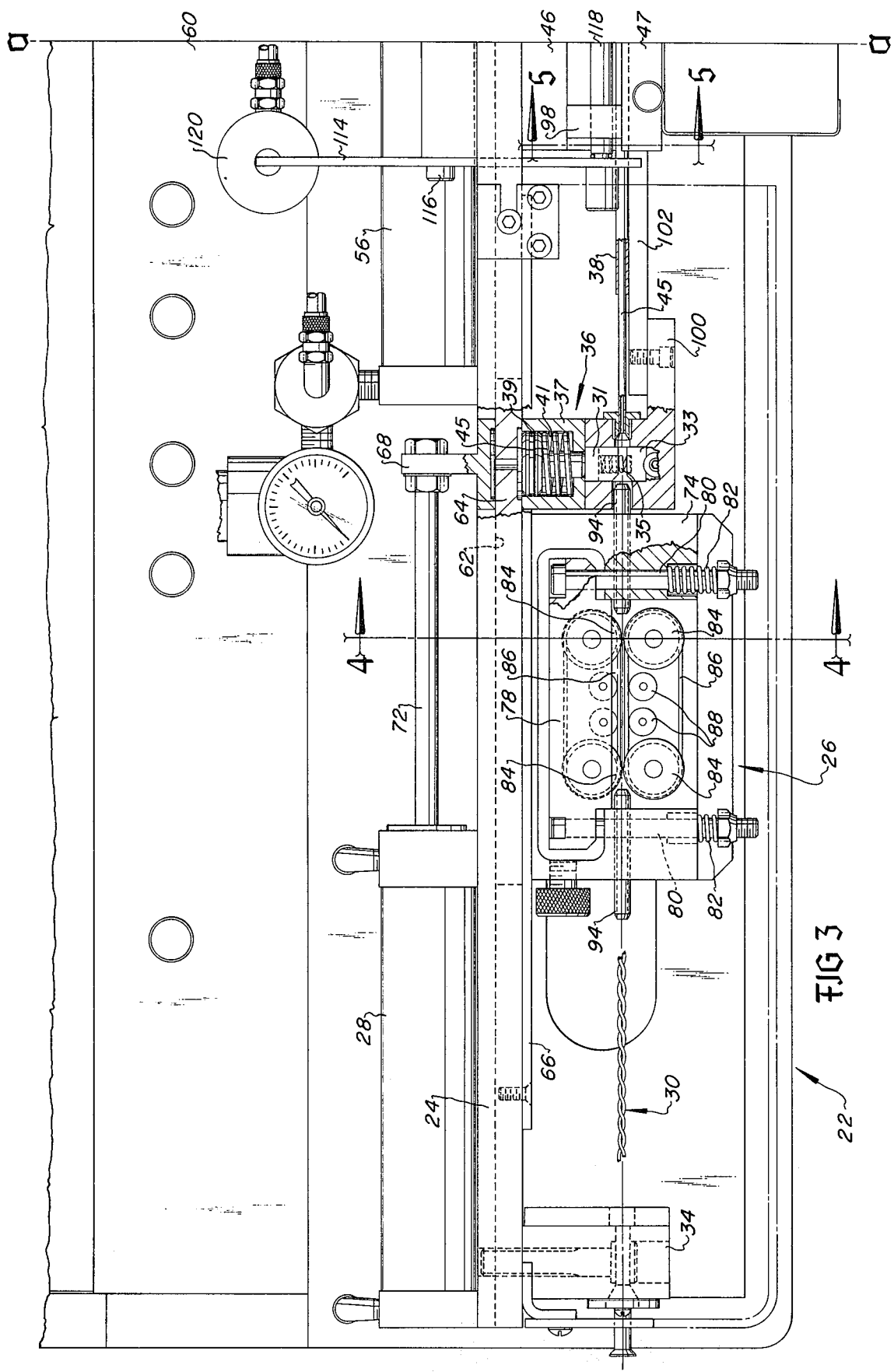
FIG. 3 is a side view, partially sectioned, taken from the same direction as the view of FIG. 1 and on a larger scale.

Referring to FIGS. 1, 2, 3, and 3a of the drawings, a cutting and insulation stripping apparatus is shown and generally designated by the numeral 22. The embodiment of the apparatus 22 illustrated is designed to be mounted on a bench or work stand 23, shown in part. The apparatus 22 is characterized by a rugged metal frame 24 on which is mounted a wire feed mechanism, generally designated by the numeral 26, which is slidable along the frame 24 in response to actuation of a reversible or double acting pressure fluid cylinder type actuator 28. As shown in FIG. 1, twisted wire pair 30 of indeterminate length is conducted to the feed mechanism 26 from a source of supply such as a large spool or the like, not shown. A prefeeding or dereeling mechanism 32 may be used to reduce the pulling effort required of the feed mechanism 26. Prior to entering the wire feed mechanism 26 the twisted wire pair 30 is passed through a detection device 34 for signalling the presence of a splice in the wire or a gap in the wire insulation cover.

The twisted wire pair is fed from the feed mechanism 26 through a releasable clamp mechanism 36 and through a telescoping guide tube 38 to respective wire and insulation cutting blade assemblies 40, 42, and 44 to be disclosed in greater detail herein. The wire and insulation cutting blade mechanisms 40, 42, and 44 are disposed in a support 46 fastened to the underside of the frame 24. A drawer 48 is disposed below the support 46 for collecting insulation pieces which are removed from the twisted wire pair.

The apparatus 22 also includes a wire clamping and untwisting unit 50 which will also be disclosed in greater detail herein. The untwisting mechanism 50 includes a housing 52 which is slidably supported on the frame 24 and is connected to a slide 54. The slide 54 is connected to a second reversible pressure fluid cylinder type actuator 56 mounted on the frame 24. A tray 58 is fastened to the frame 24 for collecting twisted wire pairs which have been cut to predetermined lengths and removed from the untwisting mechanism 50. The frame 24 including the aforementioned mechanism is mounted on a cabinet 60 which contains suitable control elements for controlling the operation of the apparatus 22.

Figure 4:
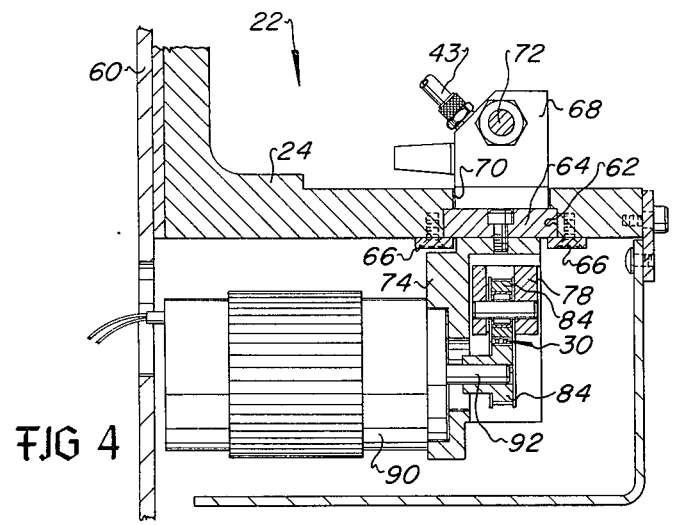
FIG. 4 is a view taken along the line 4—4 of FIG. 3.

Referring particularly to FIGS. 3 and 4 the frame 24 is characterized by having an elongated channel 62 in which a slide 64 is disposed and retained for sliding movement in the channel by retaining rails 66. The slide 64 is connected to a bracket 68 which projects through an opening 70 in the frame and is, in turn, connected to the end of an extensible piston rod 72 of the cylinder actuator 28. The feed mechanism 26 includes a support 74 which is fastened to the slide 64. As shown in FIG. 3 the support 74 includes a recess in which is mounted a member 78 disposed on elongated pins 80. The pins 80 are disposed in suitable bores in the support 74 and are arranged to include springs 82 disposed around the pins and engaged with the support.

The springs 82 are retained by suitable nuts, as shown. The feed mechanism 26 is further characterized by spaced apart externally toothed rollers 84 rotatably mounted on the member 78 and the support 74. Flexible toothed belts 86 are trained, as shown, around respective pairs of rollers 84 mounted on the support 74 and the member 78. Idler rollers 88 are also disposed on the support 74 and the member 78 for guiding and supporting the belts 86.

The feed mechanism 26 is driven by a rotary electrical stepping motor 90 which is mounted on the support 74 and includes an output shaft 92 on which a roller 84 is mounted. The motor 90 is of a well known type, commerically available, which is responsive to an electrical signal to rotate a predetermined amount, and to be precisely braked to stop when deenergized to give rotary position control on the shaft 92, and accordingly the belt 86 mounted on the support 74.

The twisted wire pair is fed through the feed mechanism between the two belts 86 which are pressed into engagement with the wire by the spring biased member 78. Accordingly, the twisted wire pair 30 may be linearly fed through the feed mechanism 26 a controlled amount in accordance with a predetermined pulsed electrical signal conducted to the motor 90, which results in a predetermined linear travel of the belts. The twisted wire pair is conducted to and from the belts 86 by guide tubes 94, FIG. 3.

Beyond the feed mechanism 26, in the direction of travel of the twisted wire pair through the apparatus 22, is disposed the wire clamping mechanism 36 including cooperable clamping jaws 31 and 33 between which the twisted wire pair is fed. The jaws 31 and 33 are biased to separate from each other by a spring 35 which moves the jaw 31. The jaws 31 and 33 are disposed in a housing 37 which is fastened to the slide 64. A fluid actuated plunger 39 is disposed in a bore 41 in the housing 37 for actuating the jaw 31 to clamp the twisted wire pair in response to a pressure fluid signal conducted to the bore 41 by a conduit 43 (FIG. 4) connected to the bracket 68. Suitable passage means in the bracket 68 and the slide 64 provide for communication of pressure fluid to the bore 41. A spring 45 in the bore 41 biases the plunger away from the jaw 31 when the bore is vented.

Figure 5:
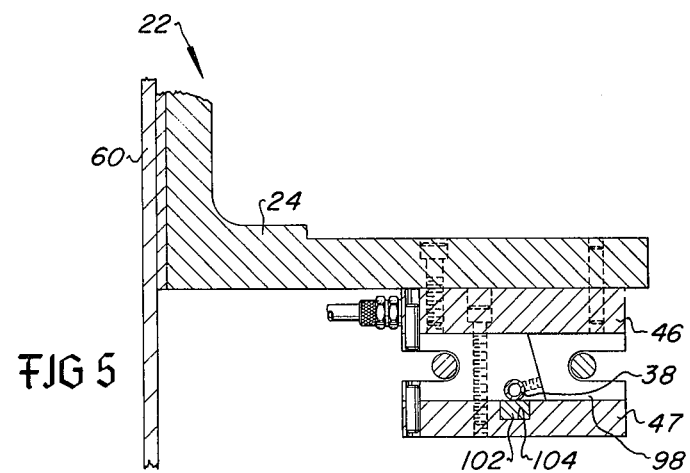
FIG. 5 is a view taken substantially along the line 5—5 of FIG. 3.

Referring to FIGS. 3, 3a, and 5 the twisted wire pair is guided beyond the clamping mechanism 36 through the guide tube 38 which also comprises a telescopic inner tube 45 removably connected to the housing 37. The outer tube 38 projects through and is secured in a support member 98. The inner tube 45 moves with the clamping mechanism 36 and the feed mechanism 26 in response to movement of the slide 64. The housing 37 includes a projection 100 which is connected to a guide bar 102. The guide bar 102 projects into a channel 104 formed in a lower support member 47 of the support 46.

As shown in FIGS. 3, 3a, and 5 the supporting means for the wire positioning and insulation cutting blade mechanisms 42 and 44 includes the upper support member 46 suitably fastened to the frame 24. A lower support member 47 is fastened to the member 98 and to a support block 106 disposed at the opposite longitudinal end of the support members 46 and 47, as shown in FIG. 3a. The member 47 and block 106 are suitably secured to the upper support member 46 to hold the upper and lower support members in spaced apart relationship. The support members 46 and 47 are respectively characterized by a plurality of transverse grooves 108 and 110, aligned one set with the other, which comprise guides in which are movably fitted the insulation cutting blade mechanisms 42 and 44 and the set of wire cutting blades 40, the latter set of blades being shown also in FIG. 9

FIGS. 3, 3a, and 9 illustrate means for actuating the blade mechanisms 40, 42 and 44 to move in a reciprocating manner in the grooves 108-110. Spaced apart pairs of actuating levers 112 and 114 are respectively pivotally mounted on pins 116 secured to the frame 24. The levers 114 are connected to parallel elongated rods 118 which project through suitable openings in the blade mechanisms 40, 42, and 44. As shown in FIG. 9, the levers 114 are connected at their upper ends to a pressure fluid cylinder actuator 120, which includes a piston 122 and piston rod 124. Referring to FIGS. 1 and 3a also, the levers 112 are similarly connected to a pressure fluid actuator 126 identical to the actuator 120. Suitable conduits provide pressure fluid to the actuators 120 and 126 to reversibly pivot the levers 114 and 112 for opening and closing the blade mechanisms 40, 42, and 44 to cut the insulation and wire of a twisted wire pair.

Figure 7:
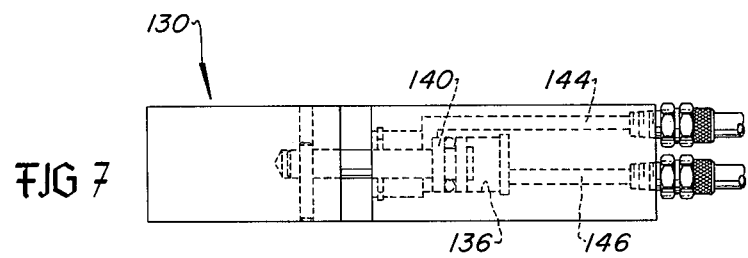
FIG. 7 is a plan view of the clamping mechanism shown in FIG. 6, and taken from the line 7—7 of FIG. 6.
Figure 6:
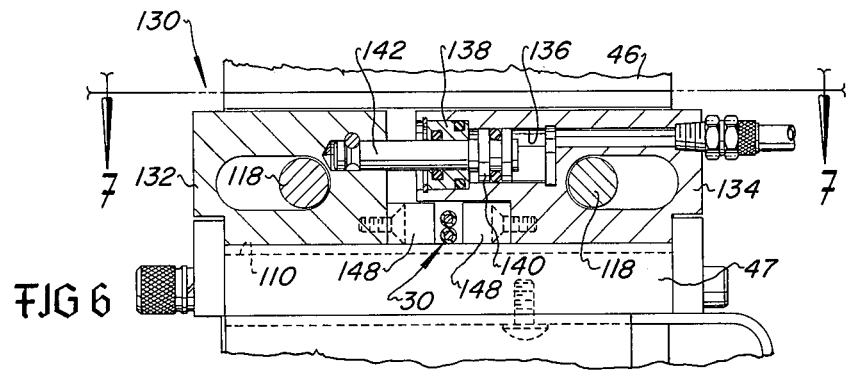

Referring to FIGS. 3a, 6 and 7 a wire gripping device 130 is removably disposed between the support members 46 and 47. The gripping device 130 includes housing parts 132 and 134 which are suitably flanged on their lower side to fit in one of the grooves 110 on the support member 47. Referring particularly to FIG. 6, the housing part 134 includes a stepped bore 136 fitted with a plug 138 to form a cylindrical chamber in which is disposed a piston 140. The piston 140 includes a rod 142 which is connected to the housing part 132. As shown in FIG. 7 passages 144 and 146 are formed in the housing part 134 and are in communication with the bore 136 on opposite sides of the piston 140 whereby pressure fluid may be alternately supplied to the bore to cause the housing parts 132 and 134 to move toward or away from each other. Wire gripping jaws 148 are removably mounted on the housing parts 132 and 134 as shown in FIG. 6. The gripping device 130 is normally positioned adjacent to the wire positioning and insulation cutting blade mechanism 42 to define one end of the section of twisted wire pair which is untwisted prior to cutting and stripping of the insulation.

The apparatus 22 further includes means for untwisting a section of twisted wire pair whereby insulation may be removed from the ends of a predetermined length of twisted wire pair and an untwisted section of each conductor wire is provided for making terminations. Referring to FIGS. 3a, and 8 there is illustrated the wire gripping and untwisting unit 50. The slide 54 is disposed in the channel 62 formed in the frame 24 and includes a bracket 150 connected to the piston rod 152 of the fluid actuator 56. The actuator 56 is mounted on the frame 24 generally in alignment with the actuator 28, and is operable to reciprocably move the untwisting unit 50 respectively away from and back to the support members 46 and 47 starting at the position shown in FIG. 3a.

Figure 11:
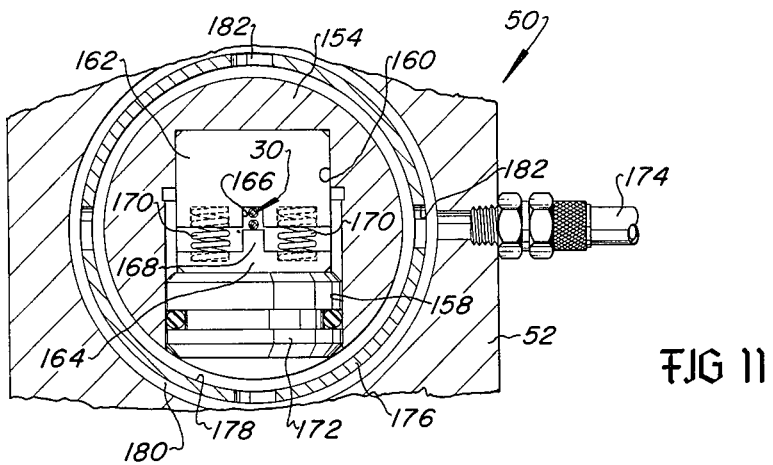

Referring to FIGS. 10 and 11 also, the housing 52 includes an opening in which a cylindrical casing part 154 is rotatably mounted on bearings 156. The casing part 154 is characterized by a cylindrical bore 158 which intersects a rectangular opening 160 in which are disposed wire clamping jaws 162 and 164. The clamping jaw 162 includes a longitudinal groove 166 and the jaw 164 includes a longitudinal flange 168 which may be moved into the groove 166 to clamp the twisted wire pair. The jaws 162 and 164 are biased away from each other by plural pairs of coil springs 170 suitably retained in recesses formed in the jaws as shown. The jaw 164 is engaged with a piston 172 disposed in the bore 158 which may be actuated by pressure fluid to move the flange 168 into the groove 166 to clamp the twisted wire pair. Pressure fluid is supplied to and vented from the bore 158 by way of a conduit 174 which is in communication with the bore 158 and with a circular manifold member 176. The manifold 176 is characterized by two concentric channels 178 and 180 which are interconnected by radial passages 182 to provide for conducting pressure fluid to and from the bore 158.

As shown in FIGS. 3a, and 10 the rotating casing part 154 includes a reduced diameter portion 155 which may be disposed directly adjacent to the insulation cutting blade mechanism 44. The casing part 154 is retained in the housing by a cover 184 which includes a funnel shaped opening 186 aligned with the groove 166 in the jaw member 162.

The casing part 154 is also fitted with a drive sprocket 188 which is engaged with a toothed belt 190, as shown in FIGS. 3a, and 8. The belt 190 is also engaged with a drive sprocket 192 mounted on the output shaft of a motor 194 disposed on the housing 52. The motor 194 is an electrical stepping motor of the same general type as the motor 90 and is responsive to a controlled electrical signal to rotate a predetermined number of complete or partial revolutions. A cover member 196 is fastened to the housing 52 for enclosing the sprockets 192, and 188 and the belt 190. The cover 196 is shown partly broken away in FIG. 8 to illustrate the belt drive arrangement for rotating the clamping jaws 162 and 164 and the casing part 154. The sprocket 188 and the cover 196 are both provided with suitable openings to provide for the twisted wire pair to pass through the untwist unit 50.

Referring further to FIGS. 3a and 8 a bracket 198 is attached to one of the frame 24 and comprises a support for a pair of elongated arms 200 and 201 which are respectively pivotally mounted on the bracket. The arms 200 and 201 are connected on one side of their pivots to a linear cylinder type actuator 202 similar to the actuator 126. The arms 200 and 201 include insulated clamping pads 204 mounted on their lower ends as shown in FIG. 8. The arms 200 and 201 are operable to be moved together at their lower end to clamp a twisted wire pair which has been cut and stripped of a predetermined length of insulation and moved into position for clamping by the pads 204 as a result of movement of the untwist unit 50 toward the arms, viewing FIG. 3a. A detector wire 210 is fastened to the arm 201 and is operable to close an electrical circuit by engaging the arm 200 if a twisted wire pair is not in position to be clamped by the pads 204 upon movement of the arms toward each other by the actuator.

From the above description of the untwist unit 50 it may be appreciated that a section of twisted wire pair disposed between the gripping device 130 and the clamping jaws of the untwist unit may be untwisted by rotating the casing part 154 a predetermined amount in accordance with the number of twists in a wire pair between the gripping device 130 and the end of the clamping jaws 162 and 164 in the end portion 155 of the casing part 154. The number of twists will change in accordance with distance between the gripping device 130 and the end portion 155 of the casing part and in accordance with the number of twists per unit of length of the particular twisted wire pair being worked. Accordingly, a suitable control signal to the stepping motor 194 may be predetermined and used to operate the motor to untwist the wire pair prior to cutting the wire and stripping the insulation from the wire ends so formed.

The apparatus 22 is particularly well adapted to cut and strip insulation from twisted wire pairs of relatively small wire diameter. In particular, the embodiment disclosed herein is adapted to work twisted wire pair in the range of 22 to 34 gage, American Wire Gage system. The wire diameters for this range of gages varies from 0.025 in. (0.643 mm) to 0.0063 in. (0.160 mm). It may be appreciated that positioning the wire for cutting the insulation only without unintended partial or complete severance of the conductor wire itself has been a problem in the art of conductor wire insultion stripping. However, the wire positioning and insulation cutting blade mechanisms 42 and 44 of the present invention are adapted to solve this problem and operate in conjunction with the above described mechanisms of the apparatus 22 to provide improved means for cutting and removing insulation from twisted wire pair.

Figure 12:
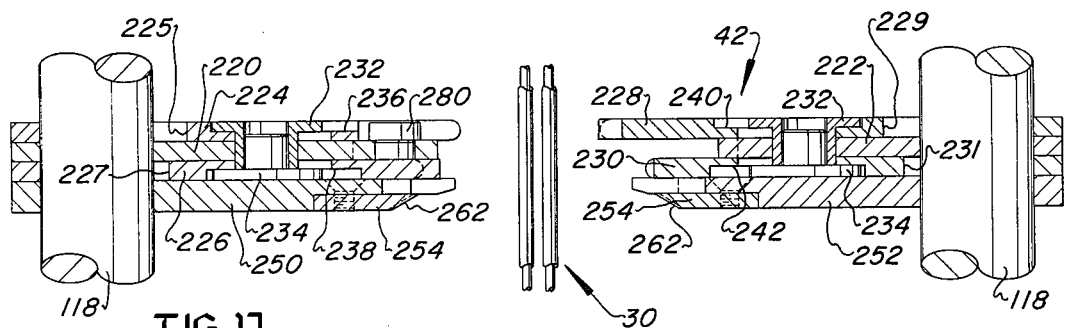
Figure 13:
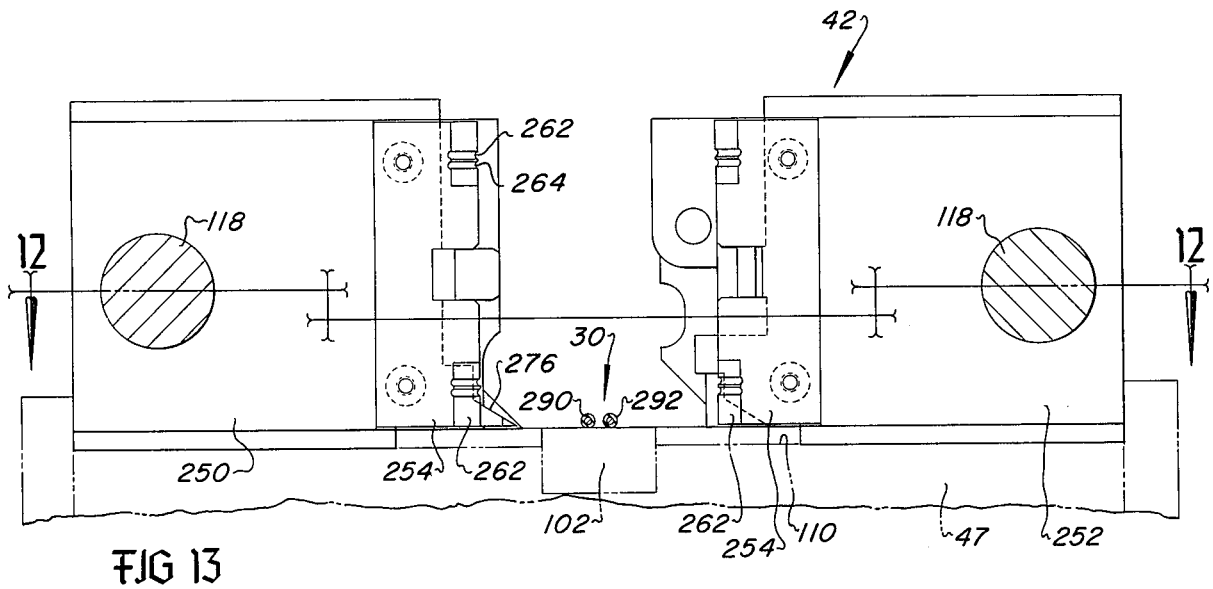

After the wire pair has been untwisted in preparation for cutting and stripping the insulation each wire must be guided into a position whereby the insulation may be accurately cut without cutting or scratching the metal conductor wire itself. This is particularly critical in many electronic circuits where the changes in electrical properties and the increased mechanical stresses caused by cuts or scratches in the conductor wire cannot be tolerated. Referring to FIGS. 12 and 13 the mechanism 42 is disclosed in detail. The mechanism 44 is substantially identical in construction and operation and in the interest of conciseness a detailed description of the mechanism 44 has been omitted. The mechanism 42 includes two relatively thin platelike members 220 and 222 which are proportioned to be mountable in preselected pairs of the grooves 108 and 110 of the support members 46 and 47 respectively, as shown in FIG. 3a, in accordance with the desired length of insulation to be cut and stripped. The members 220 and 222 are each engaged with one of the rods 118 to be moved reciprocably toward and away from each other. The member 220 is disposed between wire positioning cam plates 224 and 226 and the member 222 is similarly disposed between two cam plates 228 and 230. The cam plates 224 and 226 are held in assembled relationship with the member 220 by flanged bushings 232 and 234 which are mounted on the member 220 and are disposed in respective elongated recesses 236 and 238 in the plates 224 and 226. The member 222, in like manner, also includes flanged bushings 232 and 234 which are disposed in elongated recesses 240 and 242 in the plates 228 and 230, respectively. The plates 224, 226, 228 and 230 are also provided, respectively, with elongated openings 225, 227, 229 and 231 to provide for movement of the actuating rods 118 with respect to the plates.

Figure 14:
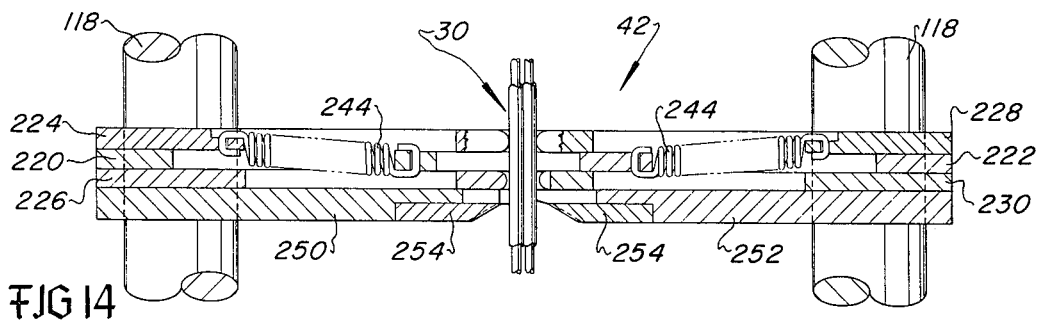
Figure 15:
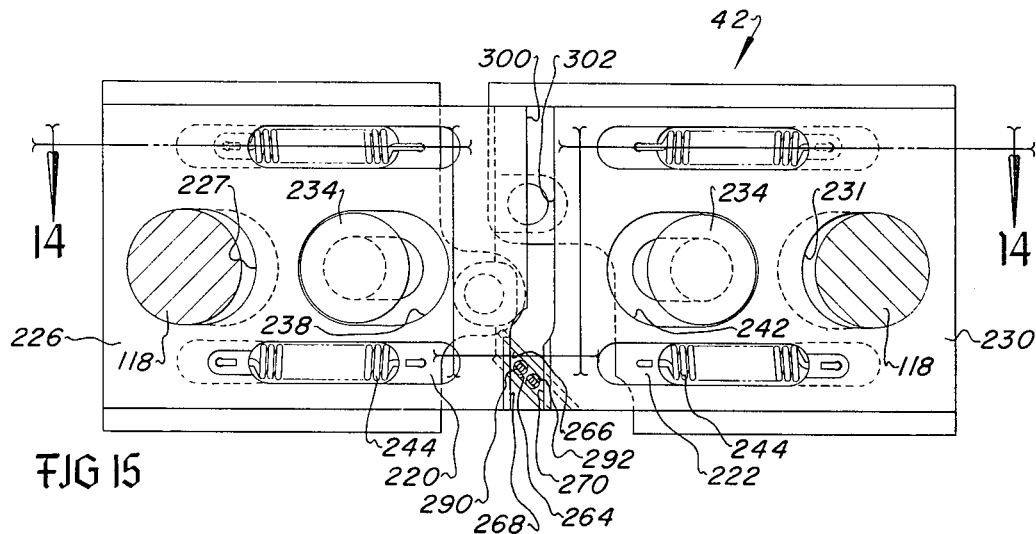
Figure 17:
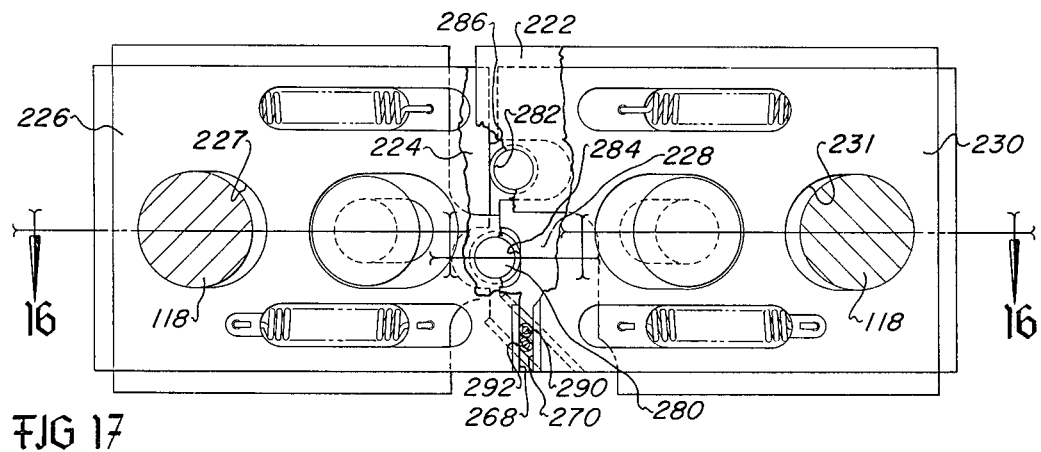

Referring also to FIGS. 14 and 15 the member 220 is connected to the plate 224 by a coil spring 244 having its opposite ends connected to the member 220 and the plate 224 as shown in FIG. 14. The plate 228 and member 222 are similarly interconnected by a second coil spring 244. The members 226 and 230 are similarly connected to the plates 220 and 222, respectively, by additional springs 244 as shown in FIG. 15. In FIGS. 15 and 17 insulation cutting blade holders, to be described further herein, are shown removed so as to illustrate the springs 244 interconnecting the plates 226 and 230 with the member 220 and 222, respectively. Suitable openings in the members 220 and 222 and the plates 224, 226, 228, and 230 are provided as shown for the springs 244 to be located in the illustrated manner. The springs 244 provide for the cam plates 224, 226, 228, and 230 to be yieldably biased into engagement with the conductor wires of the wire pair in response to movement of the members 220 and 222 toward each other.

Figure 19:
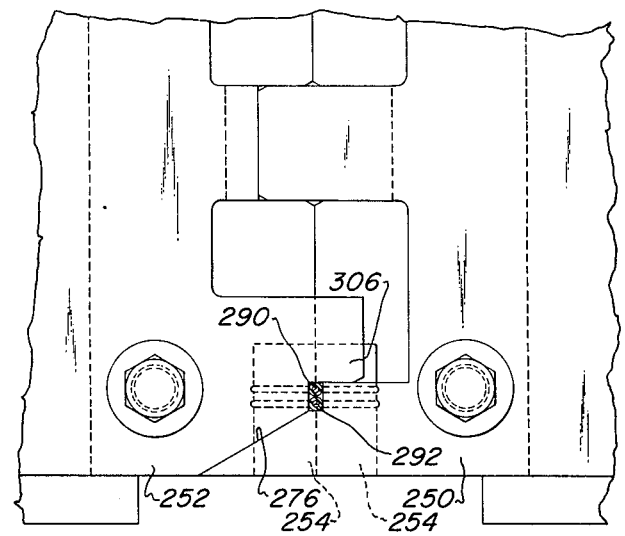
FIG. 19 is a view taken from line 19—19 of FIG. 16, showing the insulation cutting blades in the closed position.
Figure 21:
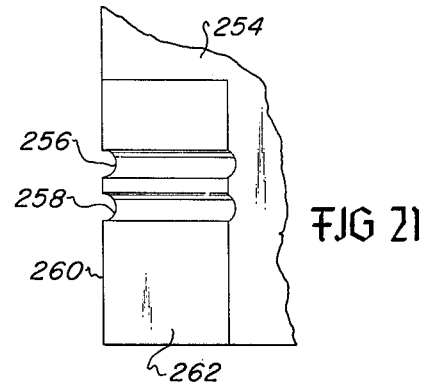
FIG. 21 is a detail view of one of the insulation cutting blades.
Figure 20:
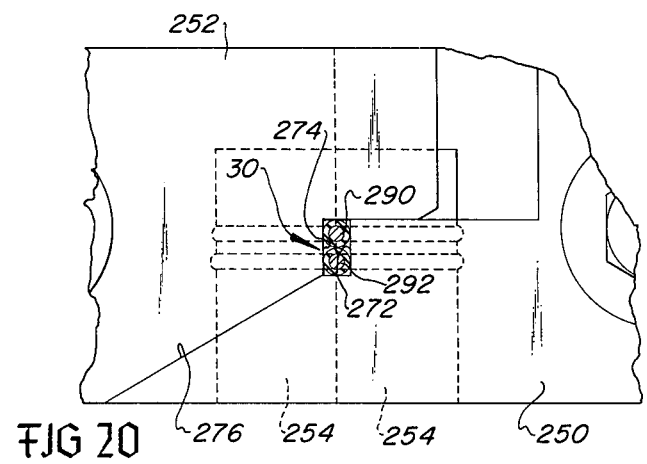
FIG. 20 is a detail view taken from the line 19—19 but on a larger scale than the view of FIG. 19.

Referring again to FIGS. 12 and 13 the mechanism 42 also includes two opposed insulation cutting blade holders 250 and 252 upon which are removably mounted insulation cutting blades 254. As shown in FIG. 21 the blades 254 are provided with closely spaced notches 256 and 258 in the edge 260 which is formed by the sloping surface 262. The notches 256 and 258 form arcuate edges for cutting the insulation of the wire of a wire pair. As shown in FIGS. 19 and 20 when two blades 254 are brought into abutting relationship the insulation of each wire is cut substantially all around the circumference of the wire proper. The notches 256 and 258 are formed to be slightly larger in their radii of curvature than the radius of curvature of the particular size wire being worked by the apparatus 22. The blades 254 are formed to have a second set of insulation cutting notches 262 and 264 which may be used as spares or be of a different size for interchanging blades on the respective holders 250 and 252 when a larger or smaller gage wire is to be worked.

The proper positioning of the individual wires of the wire pair in order to provide for accurate cutting of the insulation only is particularly difficult for smaller gage wires. In the present invention a plurality of coacting wire positioning cams operate to overcome this difficulty. Referring to FIG. 15 the cam plates 224 and 228 are respectively formed to have cooperable cam surfaces 264 and 266 which are inclined at approximately a forty-five degree angle with respect to a vertical plane passing through the axis of travel of the twisted wire pair. The cam plates 226 and 230 are respectively formed to have cam surfaces 268 and 270 which are parallel and substantially vertically aligned. Moreover, as shown in FIG. 20 the blade holders 250 and 252 are formed to have respective right angle relieved portions 272 and 274 which, when the blades 254 are moved into abutting relationship as shown, form a rectangular enclosure in which the insulated wire is held tightly captive. As shown also in FIG. 20 the blade holder 250 is provided with a sloping wire engaging surface 276 which assists the sloping cams 264 and 266 and the vertical cams 268 and 270 in positioning the wire properly to have the insulation cut without damage to the conductor wire itself.

Figure 16:
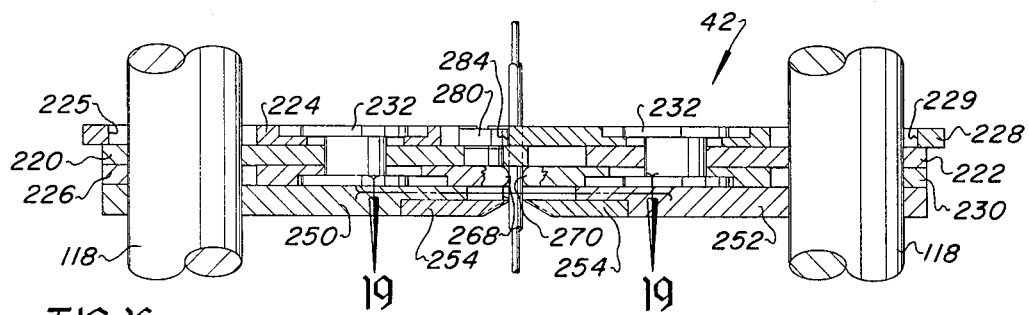

Referring to FIGS. 16 and 17 the members 220 and 222 are provided with respective projections 280 and 282 which are operable to engage the cam plates 228 and 224 on respective surfaces 284 and 286, as shown in FIG. 17, when the members 220 and 222 are moved toward each other. The projection 280 and 282 operate to limit the movement of the cams 264 and 266 toward each other and actually cause the cam plates 224 and 228 to reverse their direction of movement, that is away from each other as the cutting blades 254 are moved into abutting relationship. Relative movement in opposite directions between the cam plates 224 and 228 and the members 220 and 222, respectively, is possible by the elongated openings 225 and 229 and the springs 244 connecting the cam plates to the members.

The operation of the wire positioning cams and the insulation cutting blades will now be described, referring to FIGS. 12 through 19. After the wire pair has been untwisted the separate insulated wires 290 and 292, FIG. 13, may be disposed side by side directly on the guide bar 102. The wires 290 and 292 may be disposed at other positional relationships, one with respect to the other, also but to assure proper positioning of the wire the cams 264 and 266 and the cams 268 and 270 operate in sequence to align the wires one over the other prior to engagement and cutting of the insulation cover. When the cylinder actuators 120 and 126 are energized to move the rods 118 as well as the members 220 and 222 toward each other the cam plates 224 and 228 will be moved also by the bias of the springs 244 to cause the cams 264 and 266 to move toward each other and engage the wires 290 and 292 to position one wire 290 above the other wire 292 as shown in FIG. 15.

Continued movement of the members 220 and 222 and the cam plates 226 and 230 will cause the cams 268 and 270 to move into engagement with the wires. As the cams 268 and 270 are pressed into engagement with the wires 290 and 292 the projections 280 and 282 will, respectively, engage the surfaces 284 and 286 and reverse the direction of movement of the cam plates 224 and 228. Accordingly, as the cams 268 and 270 engage the wires to move them into vertical alignment as shown in FIG. 17 the cams 264 and 266 have been moved away from each other to allow the wires to be moved into position one over the other.

Referring to FIG. 15 the cam plates 226 and 230 are provided with respective abutments 300 and 302 which come into engagement with each other as the cams 268 and 270 reach the position shown in FIG. 17. The abutments 300 and 302 are located with respect to the respective cam surfaces 268 and 270 in such a way that when the abutments engage each other the slot formed between the cams 268 and 270 is wide enough to permit easy vertical movement of the wires 290 and 292 with the wires aligned one on top of the other. Since the wires 290 and 292 will likely not be perfectly positioned vertically to be correctly engaged by the notches in the insulation cutting blades continued movement of the rods 118 will cause the blade holders 250 and 252 to continue their movement toward each other whereby the sloping surface 276 will engage the lower wire 292 and move the wires 290 and 292 vertically until they abut the overhanging projection 306 on the holder 252. The holders 250 and 252 will also be moving to the closed position shown in FIGS. 19 and 20 as the blades commence and then complete their cutting action through the insulation with the enclosure formed by the recesses 272 and 274 providing for final and precise alignment of the wires. As the insulation is being cut by the action of the mechanisms 42 and 44 the wire cutting blades 310 and 312, FIG. 9, move together to sever the wire pair thereby forming a twisted wire pair of predetermined length. The blade holders 250 and 252 will then remain in their closed positions for both of the mechanisms 42 and 44 whereupon the gripping device 130 will be opened to release the clamping action on the wire pair 30. The clamp 36 will remain in the closed and wire gripping position as will the clamping jaws 162 and 164 of the untwist unit 50. The actuators 28 and 56 will be energized to move the clamp 36 and the untwist unit 50 away from each other to strip the insulation from the wire ends formed during the wire and insulation cutting operation. As the guide bar 102 moves with the clamp 36 the stripped insulation will drop into the drawer 48 through the opening 320 in the frame 24, shown in FIG. 9.

Referring to FIG. 3a and FIG. 18 the apparatus 22 is provided with a plurality of wire guide members 322 which may be inserted as needed between each blade mechanism 42 and 44 and the wire cutting blade mechanism 40 to form substantially uninterrupted guiding of the wire pair as it is fed to the untwist unit 50. The wire guide 322 as shown in FIG. 18 comprises a substantially flat plate member having a funnel shaped opening 324. Pins 326 and 328 on the upper and lower edges of the guide 322 provide for positioning the guide member in the grooves 108 and 110 in the respective support members 46 and 47.

FIG. 22 illustrates a length of twisted wire pair 31 having been prepared by the apparatus of the present invention. Adjacent end portions 291 and 293 of the respective wires 290 and 292 have been untwisted and have had predetermined lengths of insulation cut and stripped therefrom. As shown in the drawing FIG. 22 the opposite set of adjacent end portions 295 and 297 also have predetermined lengths of insulation removed therefrom.

The apparatus 22 may be adapted to cut the insulation from only one set of adjacent ends of a wire pair if so desired. For example, by removing the insulation cutting blade mechanism 42 or 44 from the apparatus 22 the insulation will be cut and stripped from the ends of each wire at one end only of the twisted wire pair. Moreover, by removing the blade mechanism 42 and placing the gripping device 130 at a desired position with respect to the wire cutting mechanism 40 the adjacent end portions of the wire of the wire pair which do not have insulation cut and stripped therefrom may be untwisted over the predetermined length.

The apparatus 22 may be operated by a control circuit including suitable signal generating devices which cooperate to operate the motors 90 and 194 and to operate suitable pressure fluid valves for controlling the flow of pressure fluid to and from the various pressure fluid actuators on the apparatus. The controls may include circuit devices which will allow the preselection of the amount of rotation of the motor 90 whereby a preselected length of wire pair may be fed through the apparatus 22 into position for cutting and stripping of the insulation and cutting of the prepared wire pair to the preselected length. Similar control devices, well known to those skilled in the art of electrical controls, may be used to permit preselection of the amount of rotation of the motor 194 to control the amount of untwisting of the wire pair.

It may be appreciated that the apparatus of the present invention may be suitably interfaced with various types of circuit wiring machinery and be automatically controlled by suitable numerical control equipment to produce, successively, a predetermined number of twisted wire pairs of various predetermined lengths. Moreover, by changing the positions of the mechanisms 42 and 44 in the support members 46 and 47 and with respect to the wire cutting mechanism 40 various lengths of insulation may be stripped from the wire end. Additionally, the mechanisms 42 and 44 may be easily interchanged with similar mechanisms proportioned for different wire and insulation diameters.

An operating cycle of the apparatus 22 will now be described assuming that a twisted wire pair has previously been cut and stripped so that the leading end of a wire pair has been prepared by the untwisting and stripping of the insulation from the individual wires. The tip of the leading end of the wire pair to be formed would be substantially aligned with the cutting blades 310 and 312 with respect to path of travel of the wire pair through the apparatus. The mechanisms 40, 42, and 44 would be returned to their retracted or open positions as shown in FIGS. 9 and 13. Moreover, the clamp 36 and the gripping device 130 would be in the jaws retracted or open position as would the clamping jaws 162 and 164 of the untwist unit 50. The actuators 28 and 56 would be in the position shown in FIGS. 1 through 3a and the arms 200 and 201 would be in the open position shown in FIG. 8.

A cycle of operation of the apparatus 22 is commenced by energizing the motor 90 with a suitable repeating pulse signal until the motor has rotated the predetermined amount to linearly feed a predetermined length of twisted wire pair past the mechanism 40. The pulse signal to the motor 90 is counted by a suitable signal counting device until a predetermined count is reached whereby the motor 90 is deenergized. After a short time delay which commences with deenergization of the wire feed motor 90 suitable valves are actuated by the control circuit to supply pressure fluid for actuating the clamp 36, gripping device 130, and the clamping jaws of the untwist unit 50 to clamp the twisted wire pair by these elements. At the same time pressure fluid at a regulated low pressure is supplied to the actuator 56 to tend to move the untwist unit 50 to the right, viewing FIGS. 1, 2, or 3a. This action places the twisted wire pair in tension between the gripping device 130 and the untwist unit 50 to provide for keeping the individual wires from becoming slack as they are untwisted by the untwist unit.

After a suitable time delay to provide for actuation of the jaws of the clamp 36, gripping device 130, and untwist unit 50, and the tensioning of the wire pair, a repeating pulse signal is delivered to energize the motor 194 to untwist the wire pair between the untwist unit and the gripping device. A suitable signal counting device counts the signal pulses and generates a signal to stop the motor 194 after a predetermined number of pulses in accordance with the desired number of revolutions or portions thereof of the casing part 154.

When the motor 194 is deenergized suitable valve means are actuated to conduct pressure fluid to the actuators 120 and 126 to cause the mechanisms 42 and 44 to be actuated as described hereinbefore to cut the insulation of the trailing end of the wire pair being formed and the leading end of the next to be formed wire pair of predetermined length. Simultaneously, the mechanism 40 is also actuated to cut the wire pair thereby forming a predetermined length of twisted wire pair. As the arms 112 and 114 complete their movement to the position wherein all cutting blades are closed a proximity switch is actuated by one of the arms to cause a suitable solenoid valve to supply pressure fluid to release the gripping action of the jaws 148 of the gripping device 130. The closure of the above mentioned proximity switch also generates a time delayed signal to suitable valving means to supply pressure fluid to the actuators 28 and 56 at sufficient pressure to move the feed mechanism 26, and clamp 36 to the left, viewing FIGS. 1 through 3a, and, respectively, the untwist unit 50 to the right, viewing the same drawings figures. The aforementioned action, with the blades of the mechanisms 42 and 44 in abutting relationship, will cause the insulation to be stripped from the ends of the wires disposed between the mechanisms 42 and 44 as these wire ends are pulled away.

After a suitable time delay to allow the insulation stripping action to be completed pressure fluid is vented from the clamp 36 and untwist unit 50 to release the clamping action on the wires. At the same time the actuators 120 and 126 are energized to open the blade mechanisms 40, 42, and 44 and the actuator 202 is energized to close the arms 200 and 201 to grip the wire pair just formed, and which is projecting beyond the twist unit 50 to the right viewing FIG. 3a. A stream of pressure air may be directed to blow the stripped insulation through the opening 320 into the drawer 48 as the blade mechanisms 42 and 44 are being opened.

A time delay is also initiated beginning with the signals which energize the actuators 120, 126 and 202 to allow the functions performed by these actuators to occur before a control signal is then generated to shut off the stream of insulation ejecting air and the actuators 28 and 56 are vented on one side of their respective pistons and pressurized on the opposite sides to cause the actuators to move the feed mechanism 26, clamp 36 and untwist unit 50 back to the positions shown in drawings FIGS. 1, 2, 3, and 3a. With the arms 200 and 201 in the closed or wire clamping position the twisted wire pair just formed will be withdrawn from the untwist unit 50. The leading end of the twisted wire pair 30 will be repositioned adjacent to the cutting blade mechanism 40. Even though the clamp 36 has been released after the insulation stripping action the belts 86, in firm engagement with the wire pair 30, will prevent movement of the wire pair with respect to the feed mechanism 26 and clamp 36 until the motor 90 is energized.

As the actuators 28 and 56 complete their movement to reposition the respective associated mechanisms a suitable limit switch on the apparatus 22 may be engaged by the bracket 68, for example, to thereby cause a signal to be initiated to operate suitable valve means to open the arms 200 and 201. The twisted wire pair just formed will thereby be released to drop into the tray 58. After a short time delay to allow the arms 200 and 201 to open the apparatus is ready for the next cycle of operation which may, of course, be automatically commenced by a suitable signal initiated at the end of the aforementioned time delay period.

What is claimed is:

1. Apparatus for preparing a predetermined length of insulated and pretwisted electrical conductor wire pair and for cutting and stripping insulation from at least one set of adjacent end portions of said length of wire pair, comprising:
    a frame;
    a feed mechanism disposed on said frame engageable with said wire pair for feeding a predetermined length of wire pair substantially linearly with respect to said frame preparatory to cutting said wire and said insulation;
    a wire gripping device supported on said frame beyond said feed mechanism in the direction of feeding of said wire pair and including movable jaw portions for releasably gripping said wire pair;
    wire untwisting means disposed on said frame and spaced apart from said gripping device and including rotatable clamping means for clamping and rotating said wire pair to form an untwisted section of said wire pair between said rotatable clamping means and said gripping device;
    a support disposed on said frame;
    a wire cutting blade mechanism and at least a first insulation cutting blade mechanism mounted in spaced apart relationship on said support between said gripping device and said rotatable clamping means;
    means for actuating said blade mechanisms to cut said wire and said insulation on said untwisted section of said wire pair; and,
    means for moving said adjacent end portions of said wire pair with respect to said insulation cutting blade mechanism after said insulation is cut to strip the insulation from said end portions.

2. The invention set forth in claim 1 wherein:
    said wire untwisting means includes a housing, bearing means on said housing for rotatably supporting said clamping means, and a motor drivably connected to said clamping means for rotating said clamping means a predetermined amount to untwist said wire pair between said clamping means and said gripping device.

3. The invention set forth in claim 2 wherein:
    said clamping means comprises a part rotatably mounted in said bearing means and a wire clamping jaw disposed on said part and engageable with actuating means for moving said clamping jaw between clamping and nonclamping positions.

4. The invention set forth in claim 3 wherein:
    said actuating means comprises a chamber in said part and a fluid actuated piston disposed in said chamber and engageable with said clamping jaw.

5. The invention set forth in claim 2 wherein said motor is an electrical stepping motor.

6. The invention set forth in claim 1 wherein:
said apparatus includes a second insulation cutting blade mechanism disposed on said support and arranged such that said wire cutting blade mechanism is disposed on said support between said first and second insulation cutting blade mechanisms, said first and second insulation cutting blade mechanisms being responsive to said means for actuating said blade mechanisms to, respectively, cut insulation on said untwisted section of said wire pair which forms the trailing end portions of a length of twisted wire pair being formed and the leading end portions of a successive length of twisted wire pair to be formed by said apparatus.

7. The invention set forth in claim 6 wherein:
said insulation cutting blade mechanisms are each characterized by a pair of opposed insulation cutting blades disposed on said support for reciprocating movement between open and closed positions,
said wire cutting blade mechanism includes a pair of opposed wire cutting blades disposed on said support for reciprocating movement between open and closed positions, and said means for actuating said blade mechanisms is operable to move said insulation cutting blades and said wire cutting blades between said open and closed positions in unison.

8. The invention set forth in claim 6 wherein:
said untwisting means is supported on said frame for linear reciprocable movement thereon and with respect to one of said insulation cutting blade mechanisms, and said apparatus further includes an actuator for moving said untwisting means away from said one insulation cutting blade mechanism with said wire pair clamped by said clamping means to strip insulation from said trailing end portions of said wire pair.

9. The invention set forth in claim 8 wherein:
said apparatus includes a releasable clamp mechanism supported by said frame between said gripping device and said feed mechanism for linear reciprocating movement, said clamp mechanism including releasable clamping jaws for clamping said twisted wire pair, and said apparatus includes an actuator for moving said clamp mechanism away from the other of said insulation cutting blade mechanisms with said twisted pair clamped by said clamping jaws to strip insulation from said leading end portions.

10. The invention set forth in claim 9 wherein:
said feed mechanism is connected to said actuator for moving said clamp mechanism whereby said feed mechanism and said clamp mechanism are moved in unison toward and away from said insulation cutting blade mechanisms to prevent movement of said wire pair with respect to said feed mechanism while said wire pair is clamped by said clamp mechanism.

11. The invention set forth in claim 7 wherein:
said support comprises a plurality of spaced apart and parallel guides for guiding said insulation cutting blades and said wire cutting blades and at least one set of insulation cutting blades are adapted to be disposed for guiding by a selected one of said guides whereby the length of insulation to be stripped from a set of adjacent end portions of a wire pair may be varied.

12. The invention set forth in claim 1 wherein:
said insulation cutting blade mechanism includes a pair of insulation cutting blades for cutting the insulation of each wire of said wire pair and said insulation cutting blade mechanism further includes camming means movable with respect to said insulation cutting blades for camming each wire of said wire pair into position for cutting the insulation of each wire by said insulation cutting blades.

13. The invention set forth in claim 12 wherein:
said insulation cutting blades are disposed on said support for opposed reciprocating movement between an open position and a closed and insulation cutting position and said camming means comprises a first pair of cams movable for engaging the wires of said wire pair and moving said wires toward a position for engagement by said insulation cutting blades.

14. The invention set forth in claim 13 wherein: said camming means comprises a second pair of cams movable for engaging said wires sequentially after said wires have been engaged by said first pair of cams.

15. The invention set forth in claim 14 wherein:
said first and second pair of cams are connected to actuating members disposed on said support and responsive to said means for actuating said blade mechanisms for reciprocating movement with said insulation cutting blades.

16. The invention set forth in claim 15 together with:
spring means interconnecting said cams with said actuating members for yieldably biasing said cams into engagement with said wires.

17. The invention set forth in claim 16 wherein:
each cam of said first pair of cams is formed on a plate which is engageable with means mounted on said actuating members in response to reciprocating movement of said actuating members toward each other to cause said first pair of cams to move away from a wire engaging condition.

18. The invention set forth in claim 12 wherein:
said insulation cutting blade mechanism includes a pair of insulation cutting blade holders, said blade holders including relieved surface portions forming an enclosure for aligning the wires of said wire pair for cutting by said insulation cutting blades.

19. The invention set forth in claim 18 together with a wire engaging surface on one of said blade holders for moving said wires into said enclosure as said blade holders move to the position to cause said cutting blades to cut the insulation of each wire of said wire pair.

20. The invention set forth in claim 8 together with:
clamping mechanism disposed beyond said untwisting means in the direction of feeding of said wire pair through said apparatus and operable to clamp a length of twisted wire pair for withdrawing said wire pair from said untwisting means.

* * * * *